S. G. ROSEMAN.
BRUSH MAKING MACHINERY.
APPLICATION FILED NOV. 13, 1918.

1,321,394.

Patented Nov. 11, 1919.

INVENTOR:
S. G. ROSEMAN
BY: Van Dexunnel
ATTORNEY.

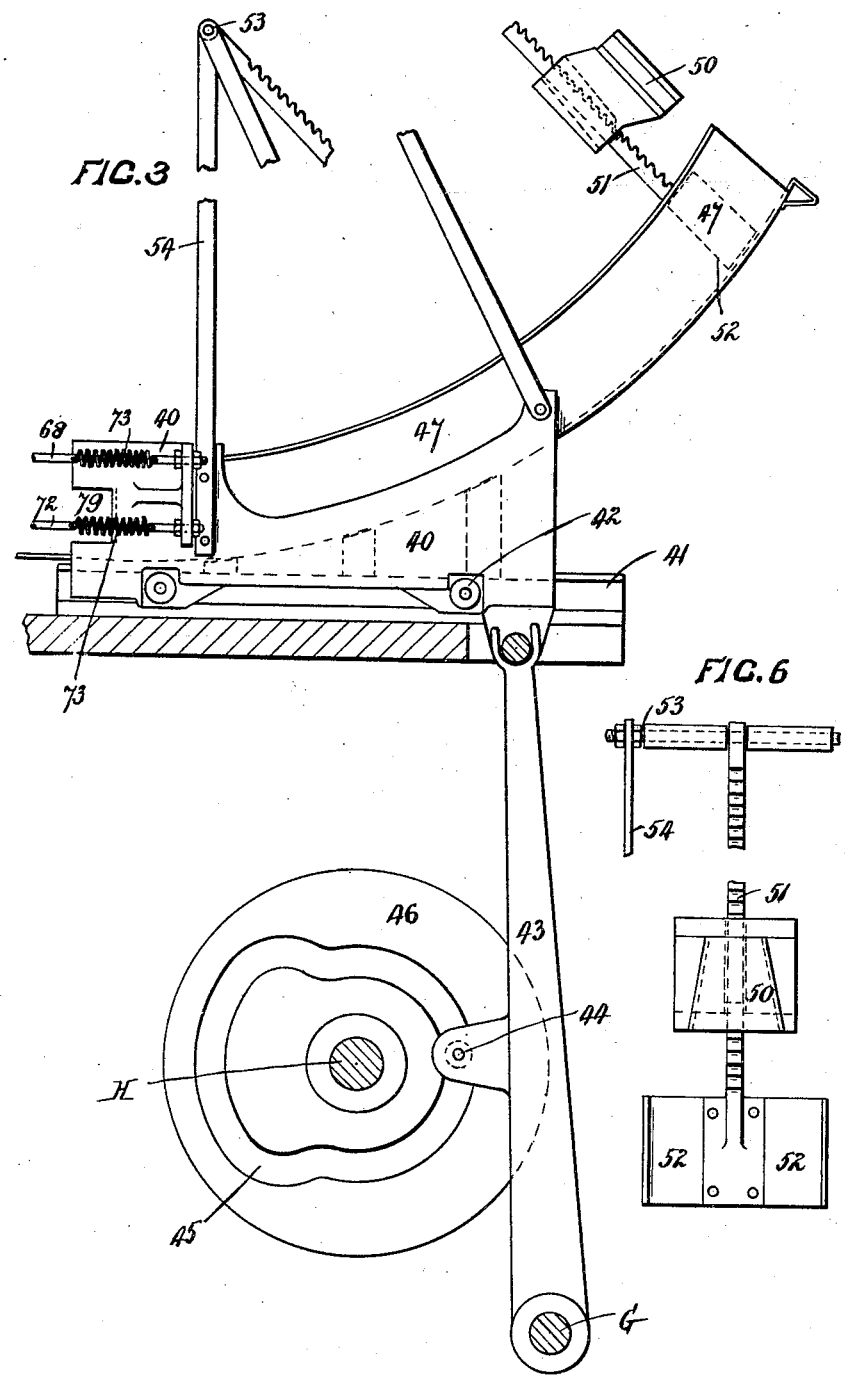

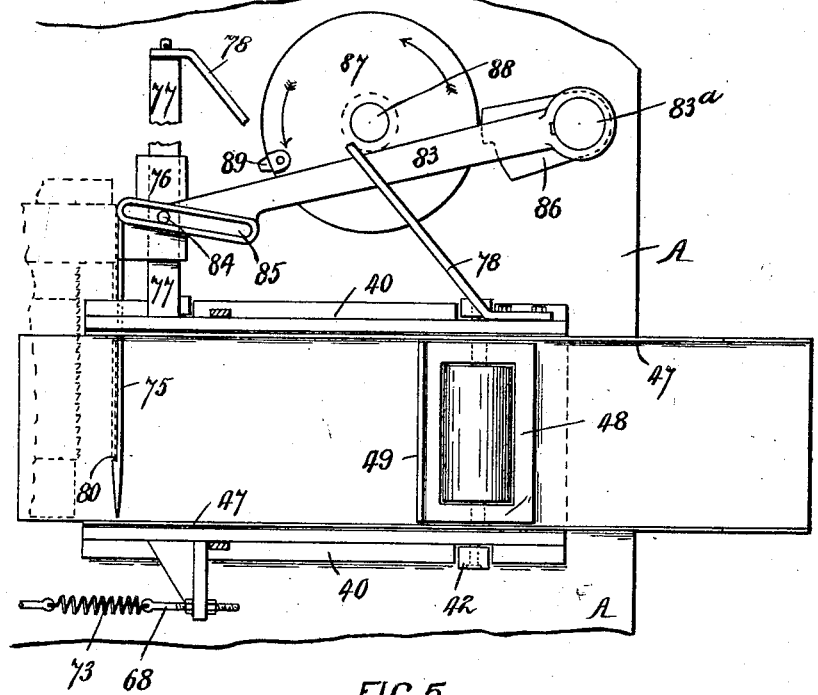
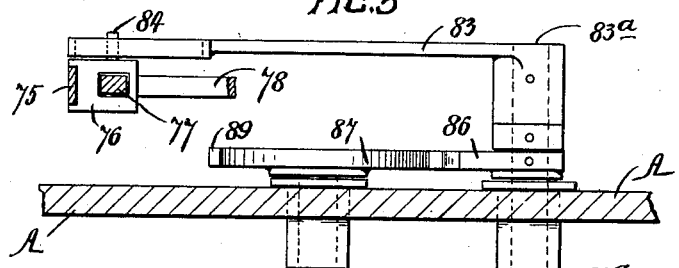
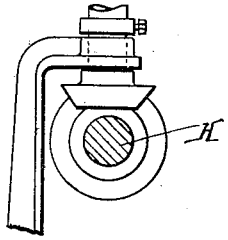
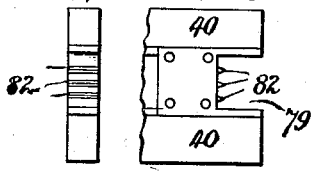

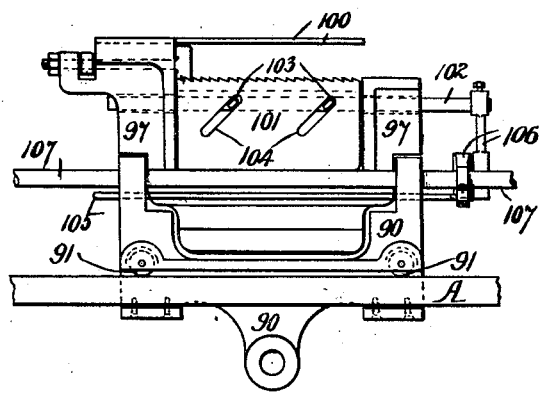
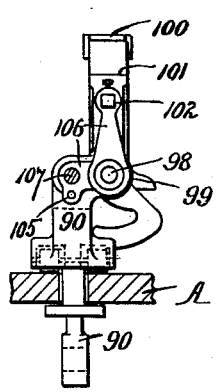
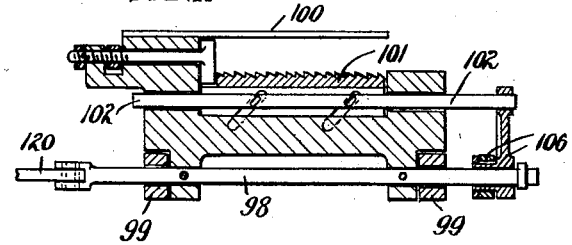
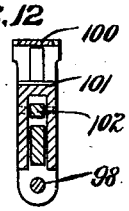
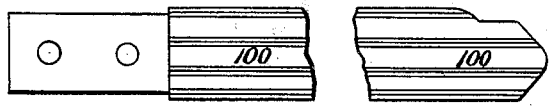
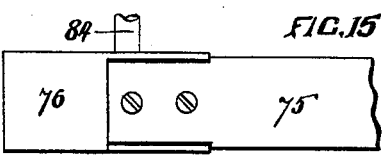
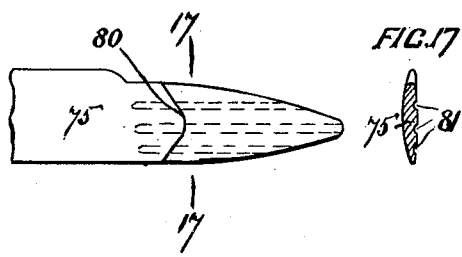
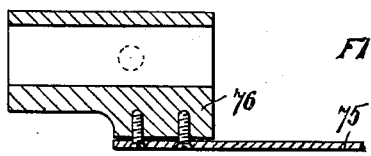

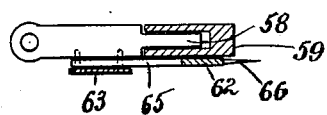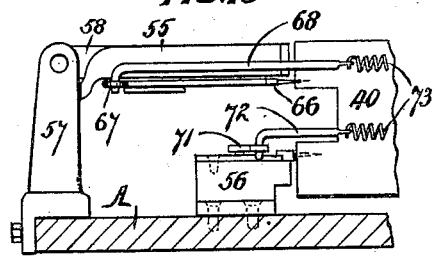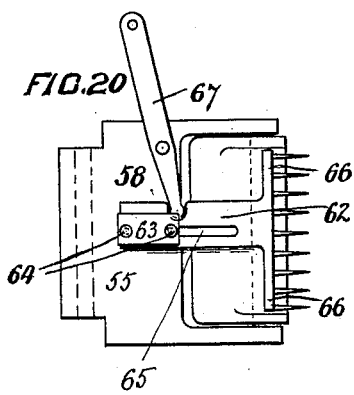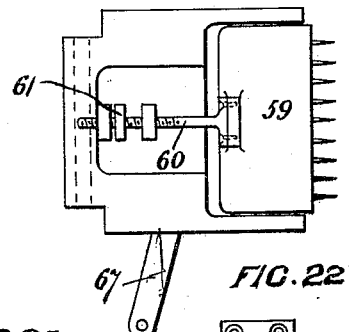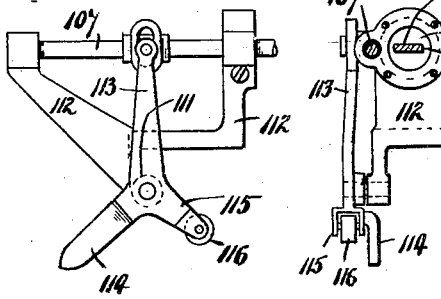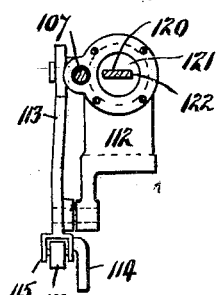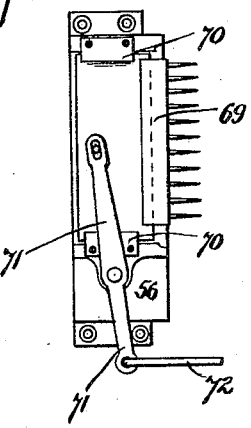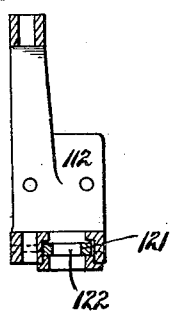

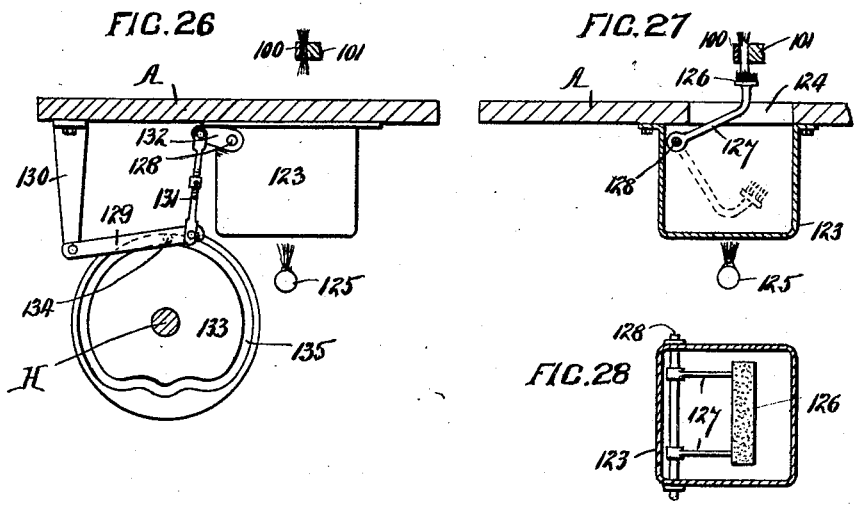
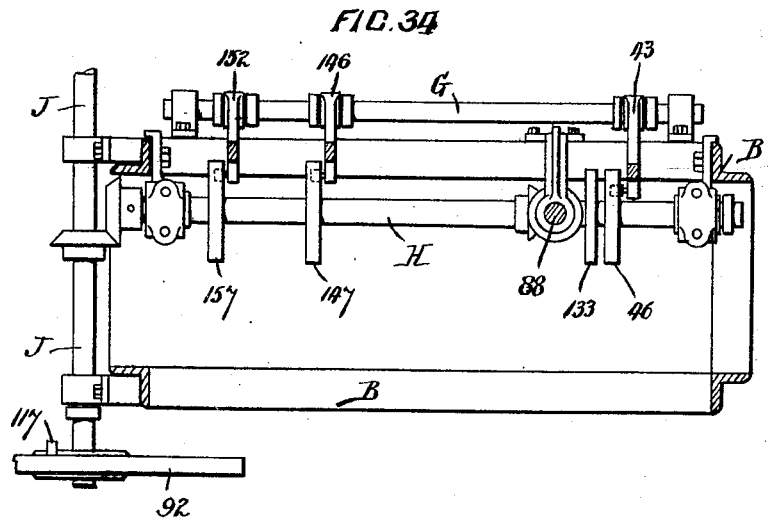

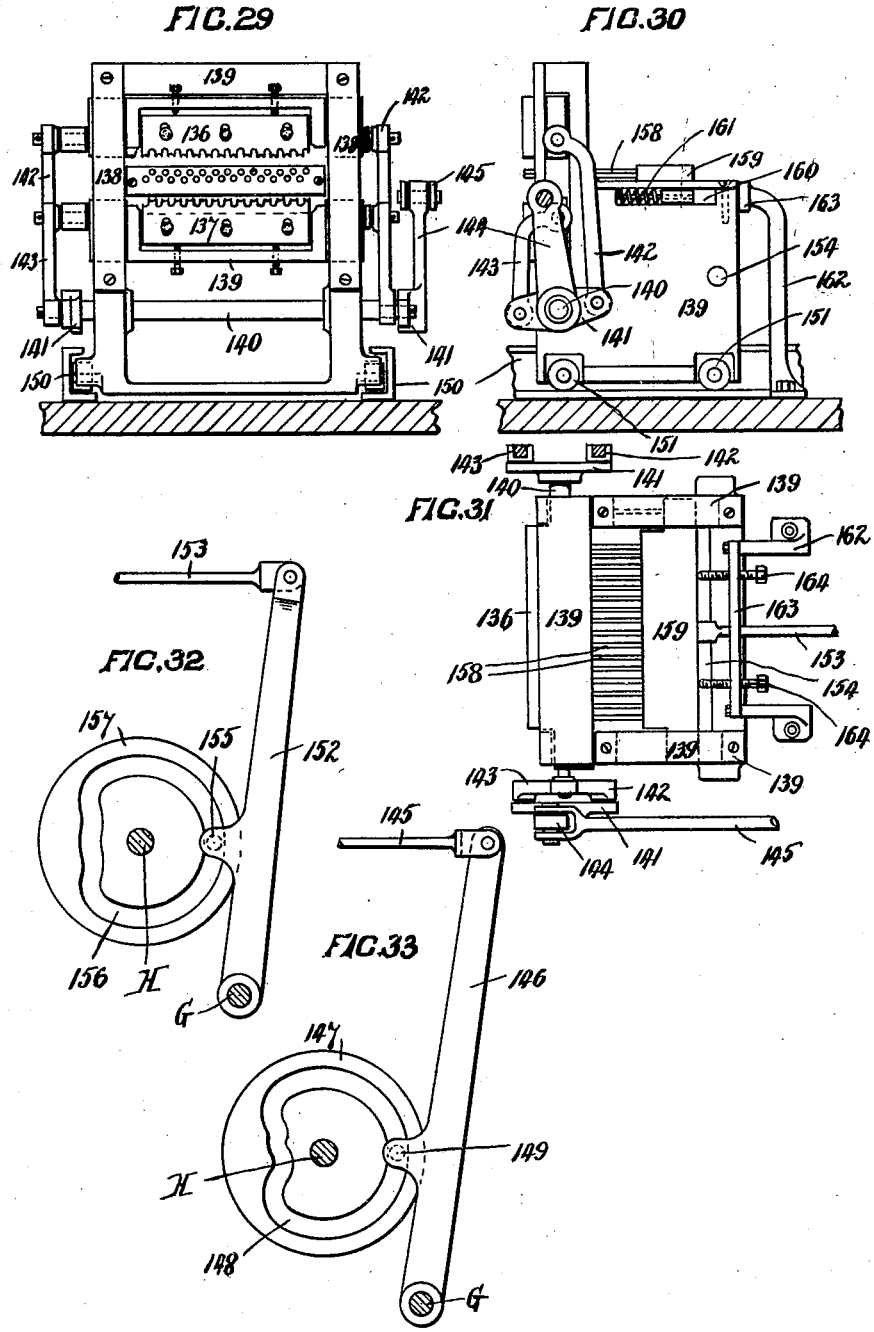

UNITED STATES PATENT OFFICE.

SAMUEL GEORGE ROSEMAN, OF AUCKLAND, NEW ZEALAND.

BRUSH-MAKING MACHINERY.

1,321,394.  Specification of Letters Patent.  Patented Nov. 11, 1919.

Application filed November 13, 1918. Serial No. 262,304.

*To all whom it may concern:*

Be it known that I, SAMUEL GEORGE ROSEMAN, subject of the King of Great Britain, residing at Auckland, New Zealand, have invented a new and useful Improvement in Brush-Making Machinery; and I do hereby declare the following to be a full, clear, and exact description of the same.

This invention relates to improvements in the machines for forming bunches of hair, fiber, or other materials for use in the manufacture of brooms and brushes constituting the subject matter of United States Letters Patent No. 1,123,596. In these machines the general principle of operation consists in arranging the material in a single mass within a box shaped magazine, and then dividing off from such mass a layer of the material, which layer is then clamped between clamping means and removed from the magazine, one of its ends being first treated with a pitch or like adhesive, after which the layer has its pitch treated ends inserted between dividing and pressing jaws by which the layer is divided into separate bunches and caused to retain the bunched state by the adhesiveness of the pitch.

In the said machine, the magazine employed is arranged vertically, the layers of material being taken from the bottom of the mass contained therein by the clamping means referred to.

The present improvements relate primarily to the construction and arrangement of the magazine by which the carrying out of the operations of feeding the material to the layer forming mechanism and the subsequent treatment of the layer ends, to the pitch, are facilitated. The said improvements consist broadly in arranging the magazine generally horizontal so that the material for forming the bunches is fed to the clamping means in a vertical condition and in so shaping the magazine that the supply of material to the clamping means will be automatically maintained. This alteration necessitates variations in the construction and arrangement and in the operation of the several parts forming the machine, and particularly in the clamping means, the pitch treating means, and the means for holding the material in the magazine, while the layer is being divided off.

In describing and illustrating these special improvements therefore, they have been illustrated in the accompanying drawings as embodied in a complete machine, altered to suit the new features, and will be hereinafter described in relation to such drawings.

In the said drawings:—

Fig. 3 is a side elevation, on an enlarged scale, of the new form of magazine constituting the principal feature of this invention, and looking from the right hand end of Fig. 1.

Fig. 4 is a plan thereof and showing also the layer parting needle mounted thereon, and its operating parts.

Fig. 5 is a side elevation of such operating parts looking from the left of the magazine.

Fig. 6 is a rear elevation of one form of pressure device for feeding the material in the magazine.

Fig. 7 is a side elevation of the forward part of the entry or left hand side of the magazine.

Fig. 8 is a front elevation of such detail.

Fig. 9 is a front elevation of the clamping device, and its carriage, the clamp being in the raised, or vertical position.

Fig. 10 is a right hand elevation thereof.

Fig. 11 is a longitudinal sectional elevation of the clamp itself.

Fig. 12 is a cross sectional elevation thereof.

Fig. 13 is an underneath plan, and

Figure 1:
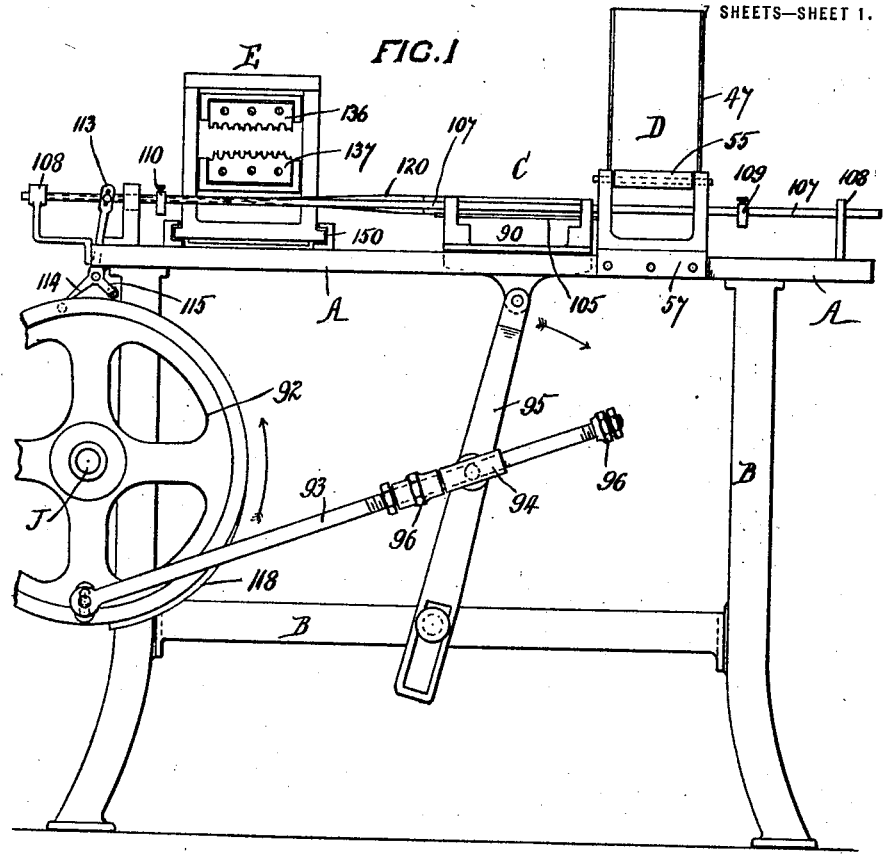
Figure 1 is a general front elevation of the whole machine.

Fig. 14 a cross section of the upper clamp member on an enlarged scale.

Fig. 15 is a front elevation and

Fig. 16 is a sectional plan of the parting needle and its carrier slide drawn to the same scale as Figs. 13 and 14.

Fig. 17 is a cross section of the needle on the line 17—17 of Fig. 15.

Fig. 18 is a right hand side elevation of upper and lower bridge pieces for engaging and holding the front of the mass of material in the magazine during the layer dividing operation.

Fig. 19 is a plan, and

Fig. 20 an underneath plan of the upper bridge piece.

Fig. 21 is a transverse section thereof.

Fig. 22 is a plan of the lower bridge piece.

Fig. 23 is a front elevation.
Fig. 24 a side elevation and
Fig. 25 a sectional plan of details that will be hereinafter more fully referred to.

Fig. 26 is a left hand side elevation of the pitch treating means.

Fig. 27 is a cross sectional elevation thereof.

Fig. 28 is a sectional plan of Fig. 27.

Fig. 29 is a front elevation of the bunching means.

Fig. 30 is a side elecation thereof.

Fig. 31 is a plan thereof.

Fig. 32 is a detail view of the means for feeding the bunching means to and fro across the machine table.

Fig. 33 is a similar view of the means for opening and closing the punching jaws.

Fig. 34 is a plan view of the driving mechanism for the various parts of the machine.

The machine follows the general lines of construction and arrangement and the same sequence of operations of its parts as the machine covered by the earlier patent, that is to say, the mechanism is carried on a table A supported on underframing B and consists of a clamping device C that is caused to move to and fro along the table top between the magazine D and the buncher E. This clamp enters the front of the magazine in an open condition, is then closed so as to grip a layer of such material within it and travel back out of the magazine with such layer, after the bottom edge has been impregnated with a pitch or other binding preparation. The clamp then moves to the other end of the table and positions the treated end of the layer in the line of the buncher E which moves forward with its jaws open and then closes such jaws on to the layer end and divides it off into separate bunches which are compactly pressed together by the jaws so that the pitch binds the material of each bunch together. The clamp then opens to free the layer, the buncher moves back and its jaws open, while extracting pins pass forward between the jaws engaging the back ends of the bunches and pushing them out of the buncher whence they fall through an opening in the table, into a receptacle arranged beneath it.

The whole series of operations by which the material is thus bunched are carried out on each complete rotation of the power shaft, the several parts working in synchronism with one another.

In the present invention the magazine D, shown in detail in Figs. 3 to 8, is formed by a cradle 40 that is mounted in guides 41 extending transversely from front to rear of the table A near one end thereof, so that the cradle may move to and fro within such guides. The cradle may be mounted on rollers 42 to reduce the friction. It is actuated in the required manner by means of the cam arm 43 pivoted to the shaft G mounted in the underframing of the table, and carrying a cam roller 44 that lies within a cam race 45 in the face of the cam disk 46. This disk is mounted on the shaft H mounted in bearings in the table frame and receiving its rotation from the power shaft J as shown in Fig. 34. The cam race 45 is so shaped that each rotation of the shaft H will cause the magazine cradle to be moved, first, forward to the front of the table, and then rearward, with a prolonged pause at each limit of such movement.

The said cradle is formed with side cheeks between which fits the magazine proper 47, which is constituted by an open trough that is curved longitudinally and fits upon blocks in the bottom of the cradle correspondingly curved to receive it. This trough is made of sufficient depth to receive the brush forming material when stacked on end within it, and it is arranged with the magazine curving upward from its front to the rear as shown in Fig. 3.

The mass of material on end, stacked within the magazine is thus adapted to slide down, while maintaining the vertical position to the front of the magazine, as the successive layers are removed from the front end in the operation of the machine. To provide for the said mass being kept tightly compacted and positively fed downward to the magazine front, a moving weight is provided to engage its back end. This weight may consist in the roller weight 48 shown in Figs. 2 and 4 running on the bottom of the magazine and having the presser plate 49 on its front for engaging the mass, or it may be formed by the swinging weight shown in Figs. 3 and 6. In this case the weight 50 is mounted on an arm 51 to the lower end of which a presser plate 52 is fixed, which plate is made of the cross sectional area of the magazine, while its upper end is pivoted upon a cross bar 53 fixed between the upper end of standards 54 attached to the respective sides of the front of the cradle 40. The arm swings on this cross bar and its free lower end follows the curve of the magazine bottom and thereby causes the presser plate to feed the material forward. The weight 50 is made adjustable on the arm in order that the degree of its pressure may be varied at will. This adjustment is preferably provided for by forming the back of the arm with ratchet teeth and passing the arm through a slot in the weight the lower back edge of which is formed with a single tooth that engages in such teeth. The weight may be moved up or down on the arm and supported at any desired position thereon.

The forward end of the magazine is left open so that the brush material may be removed through such front by the layer dividing and clamping means to be hereinafter described.

Figure 2:
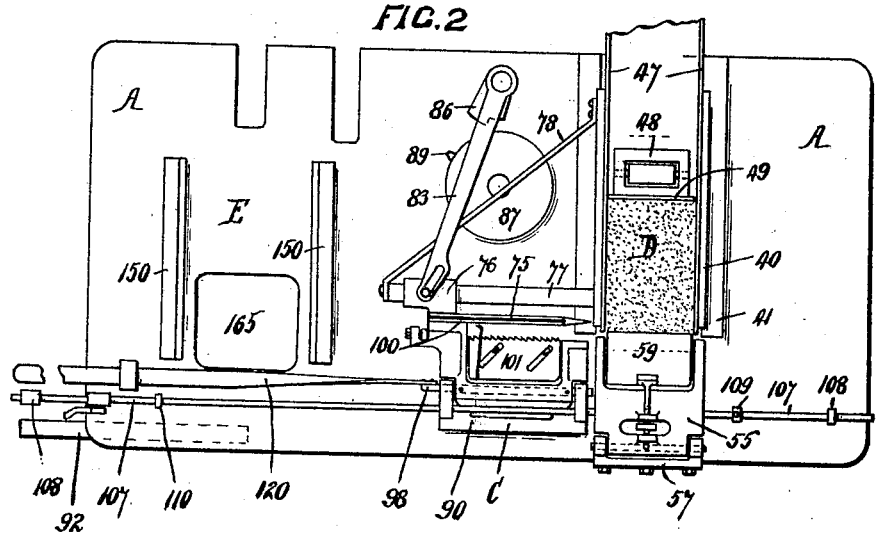
Fig. 2 is a plan thereof, the bunching jaws being removed.

For supporting the material mass, when the magazine is in the forward position, the bridge pieces shown in detail in Figs. 18 to 22 and in general position in Figs. 1 and 2, are provided. These consist in an upper bridge 55 and a lower bridge 56. The upper bridge is secured to a vertical block 57 fastened to the front of the table A, so as to extend horizontally rearward, and is formed by a slide block 58 on which a sliding head or plate 59 is mounted so as to be adapted to move in or out thereon. This head is shaped, at its back end, so as to enter the top portion of the front of the magazine when the magazine is in the forward position and it is made adjustable on the slide block 58 so that the distance it projects into the magazine front may be regulated at will. This regulation is provided for by attaching the head to a rod 60 which rod passes loosely through a pair of knobs on the top of the block and is threaded to receive a nut 61 positioned between such knobs and by turning which, the rod, and consequently the head, may be moved back or forward to regulate its position. This regulation of the bridge head will thus serve to position the front of the brush material in the magazine in relation to the front edge of the magazine when such is in the forward position, and therefore will regulate the thickness of the layer to be removed by the dividing and clamping portion of the machine.

The lower bridge 56, is fixed to the table A and its rear end is shaped to just enter the forward end of the magazine when the magazine moves forward.

Mounted on the underside of the slide block 58 of the upper bridge is a sliding plate 62 shown particularly in Figs. 20 and 21, that is kept in position by means of a plate 63 screwed to the bottom of such block by screws 64 passing through a slot 65 extending rearward in the plate 62 so that such plate may move backward and forward on the block. The forward end of this plate is provided with a comb 66 formed by forwardly projecting pins, which comb is adapted to be projected beyond the front end of the bridge head 59 or to be retired behind such end, as its plate 62 is moved back and forward. The comb pins are made of such a length as to project into the bunch material mass and are adapted to be so projected when the magazine is in its forward position and to be retired when the magazine removes to its rearward position. This is effected automatically through the movements of the magazine by means of a lever 67 that is pivoted to the underside of the block 58, one end of which connects with the plate 62 while its other end projects sidewise from the bridge and is connected by means of the rod 68 with the side of the magazine cradle, as shown in Fig. 18 and also in Figs. 3 and 4. The forward movement of the magazine will therefore turn the lever 67 in the direction necessary to move the comb 66 outward or rearward, while the reverse movement of the magazine will move the comb inward or forward.

The lower bridge 56 is also provided with a similar comb 69 (Fig. 22) mounted to slide backward and forward in guides 70 in the top of such bridge and operated by a lever 71 pivoted on such bridge and connected by the rod 72 with the magazine so that this comb also moves backward and forward with the comb 66 through the movements of the magazine.

The connection of each of the rods 68 and 72 with the magazine is preferably spring cushioned by introducing a helical spring length 73 into the rod, as shown in the drawings. This provides that in the forward movement of the magazine the springs will be compressed before turning the respective comb levers and likewise on the rearward movement will be extended before acting upon the levers. Thus the combs will be moved in and out only as the magazine moves through the latter portions of its out and in movements.

The purpose of these combs is to engage in the bunch material in the magazine and hold it firmly as the parting needle is moved laterally through the front of the mass, thereby preventing such needle from pushing the material sidewise and insuring a clear division of the front layer from the mass, and then when the magazine has been moved rearward to leave the layer in the clamp, to move forward freeing the layer so that it may be carried out in the clamp.

In this machine the parting needle 75 is fixed to a slide head 76 that is mounted to slide to and fro along a slide bar 77 fixed to extend sidewise from the magazine cradle above the table A, and suitably stayed at its outer end by the stay 78, as shown in Figs. 4 and 5 and also in Fig. 2. The forward edges of the magazine cradle 40 are cut away to form the opening 79 (Fig. 3) positioned about half way in their height to allow for the entry of the needle at a distance to the rear of the magazine front and also to permit of the entry of the clamp to be hereinafter described. The needle is shaped as shown in the detail views Figs. 15 and 17 with a double convex surface for a short distance from its point and then with its forward face flat, thereby leaving a shoulder 80 near the point. It is positioned so that it lies in a transverse vertical plane and its back face is formed with grooves 81 (Fig. 17) extending along it for a distance from the point. The forward edge of the entry gate of the magazine is formed with teeth 82 projecting forwardly from it, as shown in Figs. 7 and 8. These teeth as the needle 75 moves in and out through the gate engage in the grooves 81 of such needle so that a combing action is performed that serves to prevent the back face of the needle dragging with it any of the brush material contained in the magazine.

The needle is adapted to be locked with the outer member of the clamp device C so as to be carried in with such clamp into the magazine and then such parts separate while the magazine moves rearward and again forward, so as to have the needle form the front rest against which the brush material left in the magazine will be held, and then to move out from the magazine after the clamp has been withdrawn and the magazine has moved to its forward position, in the same manner as in the machine covered by the previous patent referred to.

In this machine however, the mechanism for withdrawing the needle is made positive in its action and distinct from the clamp. It is shown in Figs. 4 and 5 and consists in a lever arm 83 that is fixed to a spindle 83ª mounted vertically near the rear of the table A and the forward end of which engages a pin 84 in the needle head 76 by means of a slot 85 in such lever end. This lever is adapted to turn loosely with the inward movement of the slide head. Fixed to its spindle, beneath the lever, is a cam lever 86 that overlies the table top and turns with the lever 83. Mounted to rotate on the table top is a disk 87 that is fixed upon a vertical spindle 88 that passes down through a bearing in the table and gears with the shaft H so as to be rotated synchronously with such shaft. The said disk is provided with a tooth 89 projecting from its periphery the line of rotation of which lies in the patch of the cam lever 86. The inward movement of the arm 83 turns the cam lever with it, and the disk then rotating in the direction of the arrow shown in Fig. 4, causes its tooth to engage the cam lever and turn it back, carrying also the arm 83 with it, and then the tooth passing on free of such cam lever. The disk is timed in its rotation to synchronize properly with the movements of the magazine and the clamp in the manner described, in order that the parting needle will be free to pass in with the clamp, to remain in during the rearward and forward movements of the magazine, and then to be moved out by the action of the disk and lever arm.

The layer clamping means in their construction and operation follow closely the construction and operation embodied in the former invention, with the exception that in the present, provision is made for the clamp turning from the vertical to the horizontal position as it travels from the buncher to the magazine and back to the vertical again as it moves back from the magazine to the buncher. This change is necessitated by the fact that the bunch material is vertically disposed in the magazine and requires to be turned to the horizontal in order to be acted on by the buncher.

The clamp proper therefore is hinged upon the sliding carrier 90 that is mounted to slide longitudinally along the table A near its front edge and if required provided with the antifriction rollers 91 (Fig. 9) upon which it is supported so as to run freely. It is moved to and fro by the mechanism shown in Fig. 1 which consists of a wheel 92 mounted on the front end of the driving shaft J, a connecting rod 93 pivotally attached at one end to such wheel and a rocking arm 95, the upper end of which is articulated to the carrier 90 while its lower end is loosely pivoted to the underframe B of the table. The connecting rod 93 passes through a rocking sleeve 94 pivoted on the front of the arm 95 and is provided with adjustable tappet nuts 96 screwed upon it, one on each side of the sleeve 94 and by the engagement of which with the said sleeve, the rocking arm is caused to turn to and fro and the carrier to be moved accordingly. The throw of the connecting rod and the point of attachment of the sleeve 94 to the rocking arm and also the distance apart of the tappet nuts 96 are all so adjusted that each complete rotation of the wheel will cause the carrier to move the required distance to and fro between the magazine and the buncher and to remain at each limit of its movement the length of time necessary for the functions of the magazine and buncher to be carried out.

The details of construction of the clamp are shown in Figs. 9 to 14 and consist in a frame 97 that is mounted rigidly upon a long hinge pin 98 carried in bearings 99 on the carrier 90 so that such frame will turn with the rotation of the hinge pin. The frame supports the upper member 100 of the clamp which projects over an open space in the direction of the magazine and enlarged details of which member are shown in Figs. 13 and 14. This member at its free end, is shaped to fit into the shoulder 80 of the parting needle 75 and its distance from the hinge pin 98 is so adjusted, that when the frame is in the horizontal position shown in Fig. 2, its outer face will engage neatly against the inner face of the parting needle, in order that as the clamp moves toward the magazine the end of this member will lock with the parting needle by engaging its shoulder so that they will pass as one into the magazine piercing the mass of bunch material at the desired distance from the front thereof and thus dividing off the layer from the mass. Then when the magazine moves rearward and carries the parting needle with it, the member 100 will remain on the inside of such layer.

The frame 97 also carries the inner member 101 of the clamp, this member being mounted to move toward and from the outer member by the longitudinal movement of the rod 102 mounted in the frame and having cross pins 103 engaging diagonal slots 104 in the sides of the member 101, in the manner already well known. This rod 102, in the present machine, is adapted to be operated by corresponding movements of a sliding rod 105 mounted in the carrier 90, and is connected thereto by the knuckle joint 106 permitting the hinging of the clamp in the carrier, while maintaining the longitudinal locking connection. The rod 105 is mounted to slide in the carrier and is adapted to be operated at each limit of the movement of the carrier so as to close the clamp when in the magazine and to open it when opposite the buncher. These operations are effected by the tappet rod 107 that is mounted in bearings 108 so as to extend along the full length of the table near its front edge and that also passes freely through the clamp carrier above the rod 105 therein. The tappet rod at the magazine end has a tappet block 109 fastened upon it, and at the buncher end has a tappet block 110 secured thereon. These blocks are so positioned that as the clamp carrier moves to the magazine end the corresponding end of the rod 105 will just engage with the tappet 109 so that on the tappet rod being given a reverse longitudinal movement, that tappet will engage the rod 105 and move it and the rod 102 longitudinally in the clamp to move the member 101 close up to the member 100 and thereby clamp the layer between the two members. It will then remain in such condition until the carrier and clamp have traveled to the other end of the table when, as it reaches its limit, the other end of the rod 105 will be positioned adjacent to the tappet 110. The tappet rod then being driven a reverse longitudinal movement the tappet will engage the rod 105 and move it and the rod 102 to open the clamp in the desired manner.

To provide for these movements of the tappet rod being obtained, a three armed lever 111 shown in detail in Figs. 23 and 24, is pivoted to a bearing block 112 fixed to the table end. One arm 113 of this compound lever extends upward from the pivot and is articulated to the rod 107, a second arm 114 extends downward in the form of a pawl, and lies behind the rim of the wheel 92, while the third arm 115, also extends downward, and also outward from the arm 114 and is provided with a cam roller 116 journaled in its end and resting on the periphery of the wheel 92. A pin 117 is fixed to project from the rear of the wheel rim and is adapted in the rotation of the wheel 92 to pass beneath the end of the arm 114 and when such arm is down to engage with it and raising it, to push the upper arm 113 of the lever over in the direction necessary to move the rod 107 to open the clamp. A cam race 118 is fixed to the periphery of the wheel 92 and this is adapted to engage the roller 116 and to lift the third arm 115 of the compound lever, thereby moving the arm 113 across in the other direction causing the tappet rod to be moved in the manner necessary to close the clamp. The relative positions of the pin 117 and the cam race 118 with regard to one another, and to the traveling mechanism of the clamp carrier are so adjusted that the opening and closing of the clamp take place at the proper times. The race 118 is also preferably made long enough to keep the closing pressure on the rod 105 for the whole of the period the clamp remains in the magazine.

The turning of the clamp from the vertical to the horizontal on its way to the magazine and from the horizontal back to the vertical on its way back to the buncher, is effected by attaching a long bar 120 of flat cross section to one end of the hinge pin 98. This bar in its length is given a half turn by a helical twist positioned at a suitable point. It is carried in a fixed slide block 121 arranged in the bearing block 112 (Figs. 23 to 25) and passes through a slot 122 in such block shaped to fit it neatly. The bar 120 moves with the traveling movement of the clamp and consequently the twisted bar slides through the block 121. This latter being fixed, will cause the bar to turn on its longitudinal axis in correspondence to its twist, so that as the clamp and bar move to and fro, the clamp is turned up and down in the required manner.

The means for treating the end of the layer with pitch or like binding medium are shown in Figs. 26 to 28 these means being designed to operate before the layer is withdrawn from the line of the magazine but after the magazine has been moved rearward out of the way and free of such layer. These means consist in a pitch pan 123 that is suitably supported beneath an opening 124 in the table top and beneath the position occupied by the divided layer. The material in the pan is kept hot and plastic by the burner 125 beneath the pan. A brush 126 formed by a large number of metallic pins (such for instance as gramophone needles) fixed to the plate, is mounted on arms 127 fixed to a spindle 128 in the pan ends and made of such a design and length, that when the spindle is partially rotated, the brush will be raised from within the pan and will engage with the bottom end of the layer held in the clamp, with its full face. The brush in its movements carries with it some of the binding medium which covers its pins so that the pins when they penetrate the layer ends will carry into such ends the said medium and thereby impregnate the whole of the ends of the material forming the layer.

The brush spindle 128 is turned to raise and lower the brush in the required manner, by means of a rocking arm 129 that at its rear end, is pivoted in the bracket 130 depending from the underside of the table, and at its forward end is connected by the connecting rod 131, with an arm 132 fixed at one end of the said spindle. A cam disk 133 is mounted on the shaft H adjacent to this arm and a cam roller 134 on the arm engages in a cam race 135 in the surface of such disk. This race is so shaped that on each full rotation of the disk it will move the brush up to the required height and then partially lower it and again raise it, before dropping it back into the pitch pan. It will thus give the brush a double hit against the layer end so as to more thoroughly distribute the pitch among the ends thereof. These movements, will of course, be timed to occur in proper relation to the movements of the magazine and the clamp.

The buncher mechanism shown in Figs. 29 to 33 consists in the two jaws 136 and 137 mounted to slide up and down within guides 138, in the two sides of the vertical frame 139 and each formed on its face adjacent to the other, with interlocking teeth having semi-circular ends similar to the jaws provided in the said former patent. These jaws are adapted to be moved together so as to engage the pitch treated ends of the layer between them and to divide and press such layer into the separate bunches in accordance with the number and gage of the interlocking teeth in the manner described in the specification of the aforesaid patent.

In the present machine however, the means for operating the jaws are different from those of my patent before noted and simplified. They consist in a rocking shaft 140 that is mounted in the frame 139 so as to extend along within it beneath the jaws, and on each end of which is fixed a cross head 141. From the two ends of each cross head extend arms 142 and 143 that are pivoted at their lower ends to the respective ends of such cross head and at their upper ends are journaled on pins projecting laterally from the ends of the respective jaws 136 and 137. The partial rotation of the shaft 140 in one direction will therefore, through the medium of these connecting arms draw the jaws together, while a reverse movement will move the jaws apart.

These opening and closing movements of the jaws are obtained by providing one of the cross heads 141 with a lever 144 projecting radially from its axis and in attaching the outer end of such lever to the forward end of the connecting rod 145, the rear end of which is in turn articulated to the top end of a cam lever 146. This cam lever is pivoted on the shaft G (Figs. 33 and 34) and passes upward alongside the cam disk 147, fixed on the shaft H, and in which a cam race 148 is formed, so that a cam roller 149 on the cam lever fits into such cam race. This race is so shaped that the lever arm will, in addition to following the movements of the buncher frame forward and backward on the table, impart an independent to and fro movement to the cam lever 146 while the buncher is in the forward position, thereby rocking the shaft 140 in the manner required to first close and then open the jaws with a double or repeated action.

The frame 139 is mounted to slide in the guides 150 extending across the table A and preferably to run upon runner wheels 151 journaled in the sides of the frame. It is actuated to move forward so that the jaws (while open) will be positioned one above and the other below, the layer of material held in the clamp, when the clamp has been moved to that end of the table, so that when the jaws close they will close on to such layer, and then as the jaws open, to move rearward and remain there until the clamp returns with a fresh layer. This travel of the frame is effected by means of the cam lever 152 (Figs. 32 and 34) that is mounted at its lower end upon the shaft G and at its upper end is connected to the frame 139 by means of the connecting rod 153 that is articulated to the rod 154 extending across the back of the frame. The cam lever is provided with a cam roller 155 mounted thereon and fitting in a cam race 156 formed in the adjacent face of the disk 157 fixed on the shaft H alongside such lever. This cam race is so shaped that the buncher frame will travel to and fro in the desired manner and at the required times in relation to the operations of the other parts of the machine. It is also so shaped that, when in the forward position, the frame will be retained there during the operations of the bunching jaws and while there also will have a slight rearward and then forward movement imparted to it simultaneously with the opening and closing of the jaws.

The ejector pins 158 for ejecting the formed bunches from the jaws, are in this machine, fixed to project forward from a bar 159 that is mounted at its two ends in slides 160 formed in the respective sides of the frame 139 so that such pins have their forward ends positioned in correspondence with the circular openings formed by the teeth in the buncher jaws when they come together. The bar is spring cushioned by the springs 161 (Fig. 30) in the slides so that it and the pins are normally pressed back to the position such that the forward extremities of the pins lie just within the back edges of the jaw openings. Thus when the jaws come together the ends of the pins form backs to the molds made by the interlocking teeth and thereby assist in forming bunches with flat butt ends.

Fixed to the table A are standards 162 that carry a cross bar 163 on their tops having set screws 164 projecting forwardly through it and positioned to engage the ejector pin bar 159, when the buncher frame moves forward, and to push such bar forward in its slides; the pins thus pass forward between the jaws and push the bunches from them so that they drop out. As the buncher moves forward again the said pins are withdrawn rearward by means of the springs 161. The bunches falling from the jaws will drop through an opening 165 in the table top (Fig. 2) into any suitable receptacle placed below.

It will thus be seen that on each complete rotation of the shaft J which may receive its power from any suitable source, each part of the machine will perform its function in proper relation to the other parts, so that the operation of forming the furnished bunches of the desired material all ready for insertion in the brush or broom stock, will be effectually carried out.

I claim:

1. In a brush bunch-forming machine, a table, a horizontally-movable magazine for holding bunch-forming material and having a bottom curving upwardly and rearwardly from its front end, and means for moving the magazine horizontally backward and forward on the table upon each complete operation of the machine.

2. In a brush bunch-forming machine, a table, a horizontally-movable magazine for holding bunch-forming material, means for moving the magazine horizontally backward and forward on the table upon each complete operation of the machine; a parting needle mounted at one side of the magazine and movable into and out of material in the latter; a layer clamp movable on the table, and means for causing the clamp and parting needle to move together into the bunch-forming material, and to separately leave the same.

3. In a brush bunch-forming machine, a table, a horizontally-movable magazine for holding bunch-forming material; means for moving the magazine horizontally backward and forward on the table upon each complete operation of the machine; an upper adjustable bridge-piece and a lower bridge piece, and both carried by the table and adapted to enter the front of the magazine when the latter is in forward position.

4. In a brush bunch-forming machine, a table, a horizontally-movable magazine for holding bunch-forming material; means for moving the magazine horizontally backward and forward on the table upon each complete operation of the machine; upper and lower bridge pieces carried by the table and adapted to enter the magazine when the latter is in forward position; and combs slidably mounted one on each bridge piece.

5. In a brush bunch-forming machine, a table, a horizontally-movable magazine for holding bunch-forming material, and having an opening at one side near its front end; teeth adjacent said opening; means for moving the magazine horizontally backward and forward on the table upon each complete operation of the machine; a parting needle mounted for movement in and out through the opening aforesaid and across said magazine, and having grooves along the back thereof for engagement with the teeth at said opening.

6. In a brush bunch-forming machine, a table; horizontally-movable magazine for holding the bunch-forming material, and having a bottom curving upwardly and rearwardly from its front end; a movable arm provided with a presser-plate at an end thereof and to press material toward the exit end of the magazine; a weight for said arm and adjustable thereon; and means for moving the magazine horizontally backward and forward on the table.

7. In a brush bunch-forming machine, a table having an opening therein; a horizontally-movable magazine above the table, for holding the bunch-forming material; means for moving the magazine horizontally forward to a point above said opening, and a device, for supplying liquid binding medium to bunch-forming material when removed from the magazine, said device comprising a brush and means for moving said brush through aforesaid opening.

8. In a brush bunch-forming machine, a table; a horizontally-movable magazine thereon for holding the bunch-forming material; bunch-forming jaws, a frame slidably mounted on the table; a device for removing a layer of material from the magazine to the jaws, and comprising a clamp hinged upon said slidable frame; and means for turning the clamp from a vertical to a horizontal plane to enter the magazine, and from a horizontal plane to a vertical plane to present the layer of material to the bunch-forming jaws.

9. In a brush bunch-forming machine; a table; a horizontally-movable magazine thereon for holding the bunch-forming material; a bar extending laterally from the magazine; a head slidably mounted on the bar, and provided with a pin; a parting needle fixed to said head; a lever arm pivoted on the table, and having a slot fitting the pin; a cam lever connected with said lever arm; and a rotatable cam disk for engaging the cam lever and turning it and the lever arm, to move the slidable head away from the magazine.

In testimony whereof, I have signed this specification in the presence of two subscribing witnesses.

SAMUEL GEORGE ROSEMAN.

Witnesses:
EDW. BERTRAM PRUITT,
ETHEL FRANCES COURTNEY.

Copies of this patent may be obtained for five cents each, by addressing the "Commissioner of Patents, Washington, D. C."